United States Patent [19]

Garner et al.

[11] 4,349,679
[45] Sep. 14, 1982

[54] PYRROLIDINO AND PIPERIDINO BENZ RING SUBSTITUTED PHTHALIDES

[75] Inventors: Robert Garner, Bury; Michael J. Whitehead, Failsworth, both of England

[73] Assignee: Giba-Geigy Corporation, Ardlsey, N.Y.

[21] Appl. No.: 38,023

[22] Filed: May 10, 1979

[30] Foreign Application Priority Data

May 18, 1978 [GB] United Kingdom ............... 20455/78

[51] Int. Cl.³ ..................... C09B 57/00; C07D 405/04
[52] U.S. Cl. .................... 546/196; 282/27.5; 544/41; 544/62; 544/147; 544/359; 544/372; 544/374; 546/187; 428/320.6; 548/456; 549/304
[58] Field of Search ............ 260/326.13 H, 326, 14 R; 546/196

[56] References Cited

U.S. PATENT DOCUMENTS

| | | | |
|---|---|---|---|
| 3,491,111 | 1/1970 | Lin | 260/326.14 R |
| 3,491,116 | 1/1970 | Lin | 260/326.14 R |
| 3,929,829 | 12/1975 | Borror | 260/326.14 R |
| 3,941,807 | 3/1976 | Borror | 260/326.13 H |
| 3,979,659 | 8/1976 | Borror | 260/326.14 R |
| 4,046,776 | 9/1977 | Garner | 260/326.14 R |
| 4,153,609 | 5/1979 | Petit-Pierre | 260/326.13 R |
| 4,191,690 | 4/1980 | Burri | 260/326.13 H |

FOREIGN PATENT DOCUMENTS 45-7303693 12/1970 Japan .......................... 260/326.13 H

*Primary Examiner*—David B. Springer
*Attorney, Agent, or Firm*—Edward McC. Roberts

[57] ABSTRACT

Phthalide compounds of the formula

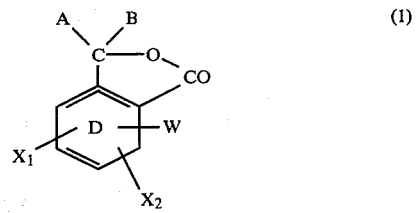

wherein A and B, independently of the other, represent a monovalent radical of the formula

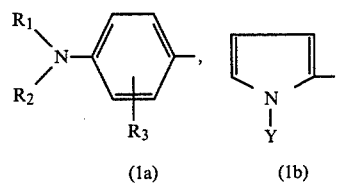

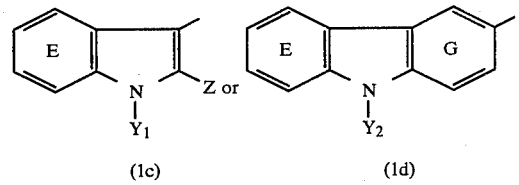

wherein $X_1$ represents an amino group of the formula

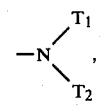

$X_2$ represents halogen or an amino group of the formula

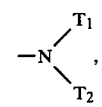

W is hydrogen or halogen, $R_1$ and $T_1$ each represents alkyl of at most 12 carbon atoms which is unsubstituted or substituted by halogen, hydroxyl, cyano, lower alkoxy or lower alkylcarbonyloxy, cycloalkyl, phenyl, benzyl or phenyl or benzyl which are substituted by halogen, nitro, lower alkyl or lower alkoxy, $R_2$ and $T_2$ each represents hydrogen, alkyl of at most 12 carbon atoms, which is unsubstituted or substituted by halogen, hydroxyl cyano, lower alkoxy or lower alkyl-carbonyloxy; cycloalkyl, benzyl or benzyl which is substituted by halogen, nitro, lower alkyl or lower alkoxy, and $T_2$ may also represent acyl having 1 to 8 carbon atoms or each pair of substituents $R_1$ and $R_2$ or $T_1$ and $T_2$ together with the nitrogen atom to which they are attached independently represents a 5- or 6-membered, heterocyclic radical, $R_3$ represents hydrogen, halogen, lower alkyl, lower alkoxy or lower alkyl-carbonyloxy, Y, $Y_1$ and $Y_2$ each represents hydrogen, alkyl which has at most 12 carbon atoms and is unsubstituted or substituted by halogen, hydroxyl, lower alkoxy or cyano, or benzyl which is unsubstituted or substituted by halogen, nitro, lower alkyl or lower alkoxy, Z represents hydrogen, lower alkyl or phenyl, and wherein the benzene ring D is not further substituted or additionally contains halogen and the rings E and G independently of the other, are unsubstituted or substituted by halogen, nitro, lower alkyl or lower alkoxy, with the proviso that at least one of W and $X_2$ is halogen; these compounds are particularly useful as color formers in pressure-sensitive or heat-sensitive recording materials.

8 Claims, No Drawings

PYRROLIDINO AND PIPERIDINO BENZ RING SUBSTITUTED PHTHALIDES

The present invention provides phthalide compounds, a process for their manufacture and their use as colour-formers in pressure-sensitive or thermoreactive recording materials.

The phthalide compounds of this invention have the general formula

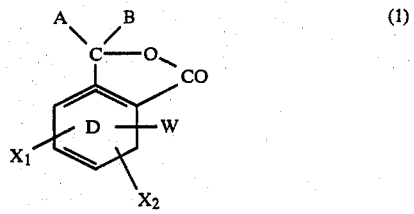

wherein A and B, independently of the other, represent a monovalent radical of the formula

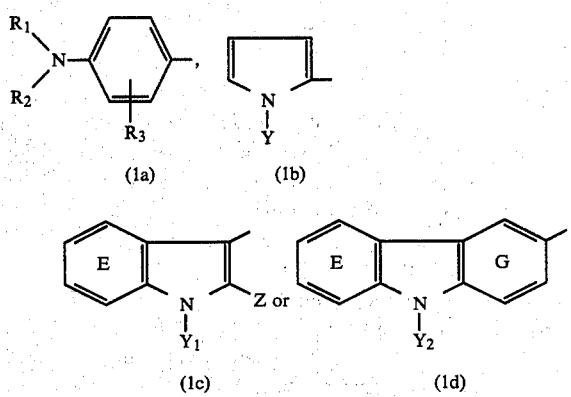

wherein $X_1$ represents an amino group of the formula

$X_2$ represents halogen or an amino group of the formula

W is hydrogen or halogen, $R_1$ and $T_1$ each represents alkyl of at most 12 carbon atoms which is unsubstituted or substituted by halogen, hydroxyl, cyano, lower alkoxy or lower alkylcarbonyloxy, cycloalkyl, phenyl, benzyl or phenyl or benzyl which are substituted by halogen, nitro, lower alkyl or lower alkoxy, $R_2$ and $T_2$ each represents hydrogen, alkyl of at most 12 carbon atoms, which is unsubstituted or substituted by halogen, hydroxyl cyano, lower alkoxy or lower alkyl-carbonyloxy; cycloalkyl, benzyl or benzyl which is substituted by halogen, nitro, lower alkyl or lower alkoxy, and $T_2$ may also represent acyl having 1 to 8 carbon atoms or each pair of substituents $R_1$ and $R_2$ or $T_1$ and $T_2$ together with the nitrogen atom to which they are attached independently represents a 5- or 6-membered, preferably saturated, heterocyclic radical, $R_3$ represents hydrogen, halogen, lower alkyl, lower alkoxy or lower alkyl-carbonyloxy, Y, $Y_1$ and $Y_2$ each represents hydrogen, alkyl which has at most 12 carbon atoms and is unsubstituted or substituted by halogen, hydroxyl, lower alkoxy or cyano, acyl of 1 to 12 carbon atoms, or benzyl which is unsubstituted or substituted by halogen, nitro, lower alkyl or lower alkoxy, Z represents hydrogen, lower alkyl or phenyl, and wherein the benzene ring D additionally may also contain a further halogen and the rings E and G independently of the other, are unsubstituted or substituted by halogen, nitro, lower alkyl or lower alkoxy, with the proviso that at least one of W and $X_2$ is halogen. Of the substituents $X_1$ and $X_2$ one is preferably in the 5-position and the other is preferably in the 7-position.

The monovalent radicals A and B, independently of the other, are preferably of the formula (1a) or (1c). Most preferably, they are both of the formula (1c).

In the definition of the radicals of the phthalide compounds, "lower alkyl" and "lower alkoxy" normally denote those groups or groups components which contain 1 to 5, in particular 1 to 3, carbon atoms, for example methyl ethyl, n-propyl, isopropyl, n-butyl, sec-butyl or amyl and methoxy, ethoxy or isopropoxy. When benzyl is substituted, it is understood that it is, as a rule, substituted on the aromatic nucleus thereof.

The radicals $T_1$ and $T_2$, can be different or are preferably identical. $R_1$ and $R_2$ are also preferably identical. If the substituents $R_1$, $R_2$, $T_1$, $T_2$, Y, $Y_1$ and $Y_2$ represent alkyl groups, they can be branched-chain or, preferably, straight-chain alkyl radicals. Examples of such alkyl radicals are methyl, ethyl, n-propyl, isopropyl, n-butyl, sec-butyl, n-hexyl, n-octyl or n-dodecyl.

If the alkyl radicals in the definition of $R_1$, $R_2$, $T_1$, $T_2$, Y, $Y_1$ and $Y_2$ are substituted, the radicals are, above all, halogenoalkyl, hydroxyalkyl, cyanoalkyl and alkoxyalkyl with a total of 2 to 4 carbon atoms in each case, such as, for example, β-chloro-ethyl, β-hydroxyethyl, β-cyanoethyl, β-methoxyethyl or β-ethoxyethyl. If the alkyl groups in $R_1$, $R_2$, $T_1$ and $T_2$ contain a lower alkyl-carbonyloxy group, then this latter group is for example an acetyloxy or propionyloxy group.

An acyl radical within the definition of Y, $Y_1$ and $Y_2$ is in particularly formyl, alkylcarbonyl of 2 to 5 carbon atoms such as acetyl or propionyl, or benzoyl.

Cycloalkyl represented by $R_1$, $R_2$, $T_1$ and $T_2$ is for example cyclopentyl or, preferably cyclohexyl.

Preferred substituents which may be present in the benzyl groups of the R-, T- and Y-substituents and in the phenyl groups of $R_1$ and $T_1$ are halogens, nitro, methyl and methoxy. Examples of these araliphatic and aromatic radicals are: o- or p-methyl-benzyl, o- or p-chlorobenzyl, o- or p-nitrobenzyl, o- or p-tolyl, xylyl, o-, m- or p-chlorophenyl, o- or p-nitrophenyl or o- or p-methoxyphenyl.

The substituents $R_1$ and $T_1$ are preferably lower alkyl, benzyl or phenyl. $R_2$ and $T_2$ are especially hydrogen or lower alkyl. $T_2$ is advantageously also an acyl radical of 1 to 8 carbon atoms. The acyl radical is, in particular, formyl, lower alkyl-carbonyl, such as acetyl or propionyl, or benzoyl. Further acyl radicals are lower alkyl-sulphonyl such as methyl-sulphonyl or ethylsulphonyl as well as phenylsulphonyl. Benzoyl and phenylsulphonyl can be substituted in the benzene ring by halogen, methyl or methoxy.

The substituents Y, $Y_1$, and $Y_2$ are, in particular benzyl or alkyl having 1 to 8 carbon atoms e.g., n-octyl or, especially methyl or ethyl.

A heterocyclic radical represented by each of the pairs of substituents $R_1$ and $R_2$ and $T_1$ and $T_2$, together with the corresponding nitrogen atom to which said pair is attached, is for example pyrrolidino, piperidino, pipecolino, morpholino, thiomorpholino or piperazino.

In addition to the substituents $X_1$ and $X_2$, the benzene ring D is preferably further substituted by one or most preferably two halogen atoms. $X_1$ is advantageously an amino group

wherein $T_1$ and $T_2$ form with the common nitrogen atom said heterocyclic radical. $X_2$ is preferably halogen. The ring E and G are preferably not further substituted or contain primarily halogen, lower alkyl, preferably methyl, or lower alkoxy such as methoxy.

Halogens in the above mentioned as well as in the substituents which follow are, for example, fluorine, bromine or, preferably chlorine.

Phthalide compounds having an important utility as colour-formers have the formula

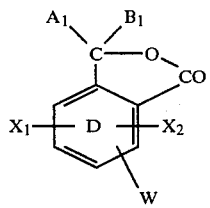
(2)

wherein $A_1$ and $B_1$, independently of the other represent a monovalent radical of the formula

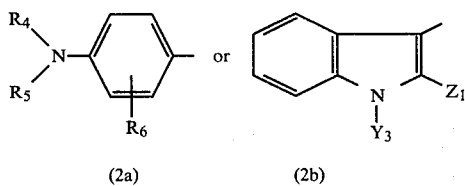

(2a) (2b)

$R_4$ and $R_5$, independently of the other, represent lower alkyl or benzyl, $R_6$ represents hydrogen, lower alkyl or lower alkoxy, $Z_1$ represents lower alkyl or phenyl, $Y_3$ represents hydrogen, alkyl of 1 to 8 carbon atoms or benzyl which is unsubstituted or substituted by halogen, nitro, methyl or methoxy and D,W,$X_1$ and $X_2$ have the given meanings.

Preferred phthalide compounds of the formula (2) are those in which each of the substituents $A_1$ and $B_1$ represent a radical of formula (2b).

Of particular interest are phthalide compounds of the formula

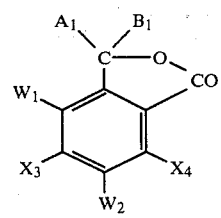
(3)

wherein $A_1$ and $B_1$ have the given meanings, $W_1$ and $W_2$, are hydrogen or halogen, of $X_3$ and $X_4$, one is halogen or an amino group of the formula

and the other is an amino group of the formula

$T_3$ represents lower alkyl, benzyl or phenyl and $T_4$ represents hydrogen, lower alkyl or lower alkyl-carbonyl or $T_3$ and $T_4$ together with the nitrogen atom to which they are attached represent a 5- or 6-membered saturated heterocyclic radical, with the proviso that at least one of $W_1$, $W_2$ and $X_3$ or $X_4$ is halogen. Particularly preferred compounds among the phthalides of formula (3) are those, wherein $T_3$ and $T_4$, together with the nitrogen atom to which they are attached, form a 5- or 6-membered saturated heterocyclic radical and especially represent a pyrrolidino or piperidino radical.

Valuable phthalide compounds which show especially advantageous properties in the colour reactant system of a recording material, are of the formula

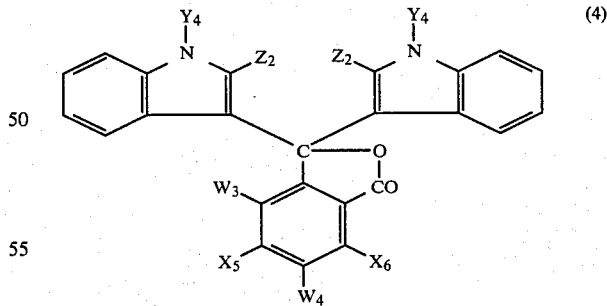
(4)

wherein $Y_4$ is alkyl of 1 to 8 carbon atoms or benzyl, $Z_2$ is methyl or phenyl, $W_3$ and $W_4$ are hydrogen, chlorine, fluorine or bromine, of $X_5$ and $X_6$ one is chlorine, bromine, fluorine, pyrrolidino or piperidino and the other is pyrrolidino or piperidino, with the proviso that at least one of $W_3$, $W_4$ and $X_5$ or $X_6$ is chlorine, fluorine or bromine.

Further valuable phthalide compounds correspond to the formula

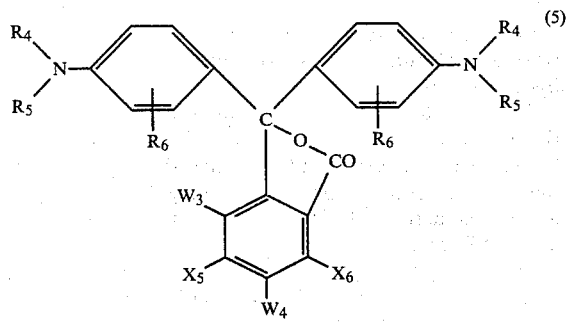
(5)

wherein $R_4$, $R_5$, $R_6$, $W_3$, $W_4$, $X_5$ and $X_6$ have the given meanings.

The phthalide compounds according to the invention can be manufactured by reacting a halogeno phthalide compound of the formula

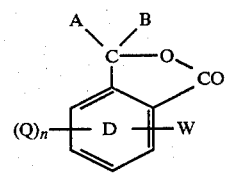
(6)

wherein A, B, D and W have the given meanings, Q represents halogen and n is 1 or 2, with n mols of an amino compound of the formula

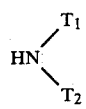
(7)

wherein $T_1$ and $T_2$ have the given meanings.

The reaction is advantageously carried out in an organic solvent and at reflux temperature. Such solvent may be any organic solvent which is unreactive towards the reactants or products and is preferably dimethylsulphoxide, tetramethylenesulphone, acetonitrile, diacetone alcohol, γ-butyrolactone, N,N-dimethylformamide, N,N-dimethylacetamide, tetramethylurea, hexamethylphosphoramide or a cycloaliphatic or aromatic hydrocarbon such as cyclohexane, benzene, toluene or xylene. The most preferred solvents are dimethylsulphoxide, hexamethylphosphoramide and toluene. The reaction time depends on the solvent and temperature and as a rule between ½ hour and 10 hours. Depending on the amino group desired in the phthalic acid anhydride radical, the halogeno phtalide compound of formula (6) is reacted with the amine of formula (7) in a molar ratio of 1:1 or 1:2. The novel phtalides according to the invention may be obtained as individual compounds or in form of a mixture containing isomeric phthalides having one group

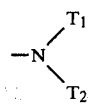

or phthalides having one and two groups

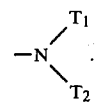

The amounts of the different individual phthalides in the mixture can be determined by chromatography or nuclear magnetic resonance spectroscopy.

The starting materials of the formula (6) can be produced by methods known per se. One process for the production of the phthalide compounds of the formula (6) comprises reacting a compound of the formula

A—H        (8)

with a compound of the formula

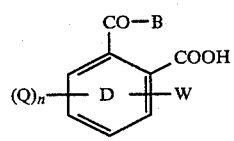
(9)

wherein A, B, D, Q, W and n have the given meanings.

Alternatively, the halogeno phthalide compounds of formula (6) can be produced by a process, wherein a compound of the formula

B—H        (10)

is reacted with a compound of the formula

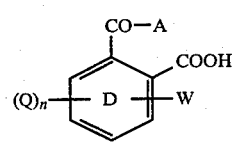
(11)

wherein A, B, D, Q, W and n have the given meanings.

Phthalide compounds of formula (6), wherein A and B are identical, are advantageously obtained by reacting a halogenated phthalic anhydride with a compound of the formula (8) or (10) in 1:2 mole ratio.

Asymmetrical halogeno phthalide compounds of formula (6), wherein of A and B one represents an aminophenyl radical of formula (1a) and the other is a 3-indolyl residue of formula (1c), may also be obtained by reacting a mixed anhydride of the formula

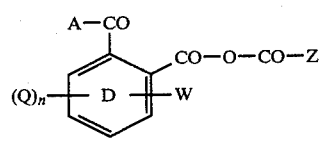
(12)

wherein A,D,Q,W and n have the given meaning and Z represents hydrogen, alkyl of 1 to 4 carbon atoms or an optionally substituted phenyl radical, with a compound of the formula B—H wherein B has the given meaning.

The phthalide compounds of formulae (1) to (5) are normally colourless or only weakly coloured. When they are brought into contact with a developer, i.e., an electron acceptor, they produce red, violet, blue or green colours of deep intensity. The obtained colours are of excellent light fastness. Moreover, the new phthalide compounds are inert as regards premature reactivity, fogging and sublimation. They are very useful when mixed with one or more other known colour formers such as phthalides, fluorans, spiropyrans, triarylmethane leuco dyes, azomethines, substituted phenoxazines or phenothiazines, in order to produce blue, navy blue, grey or black colours.

Examples of suitable known colour formers for the mixtures with the novel phthalides are Crystal Violet lactone, 3,3-(bis-amino-phenyl)-phthalides, 3,3-(bis-subst. indolyl)-phthalides, 3-(aminophenyl)-3-indolyl-phthalides, 6-dimethylamino-2-octylamino-fluoran, bis-(aminophenyl)-furyl or -phenyl methanes or benzoyl leucomethylene blue.

The phthalide compounds of formulae (1) to (5) are especially suitable as colour formers for use in a pressure-sensitive or heat-sensitive recording material, which can be copying material or documenting material.

A pressure-sensitive material comprises for example at least a pair of sheets which contain at least one colour former of formulae (1) to (5), dissolved in an organic solvent and at least one solid electron acceptor as developer. Typical examples of such developers are attapulgite clay, silicon clay, silica, bentonite, halloysite, aluminium oxide, aluminium sulphate, aluminium phosphate, zinc chloride, kaolin or any desired clay or acid reacting organic compounds such as for example optionally ring-substituted phenols, salycylic acid or salycylates or their metal salts, further any acid polymeric material, for example a phenolic polymer, an alkylphenol-acetylene resin, a maleic acid/colophonium resin or a partially or completely hydrolysed polymer of maleic acid and styrene, ethylene or vinyl methyl ether, or carboxy-polymethylene. Preferred developers are attapulgite clay, silton clay (acid modified bentonite) a zinc salicylate or a phenolformaldehyde resin. The developers are preferably in the form of a layer on the front of a receiving sheet.

The colour former effects a coloured marking at those points at which it comes into contact with the developer and the present invention accordingly further provides a process for reproducing an original which comprises imagewise exposing a pressure-sensitive recording material according to this invention and containing a developer, to pressure.

In order to prevent the colour formers becoming prematurely active in the pressure-sensitive recording material, the colour formers are as a rule separated from the developer. This can appropriately be achieved by incorporating the colour formers into foam-like, sponge-like or honeycomb structures. Preferably, the colour formers are enclosed in micro-capsules, which as a rule can be crushed by pressure.

When the capsules are crushed by pressure, for example by means of a pencil, and the solution of the colour former is thus transferred onto an adjacent sheet which is coated with an electron acceptor, a coloured area is produced. This colour results from the dyestuff, formed during this process, which absorbs in the visible region of the electromagnetic spectrum.

The colour formers are preferably encapsulated in the form of solutions in organic solvents. Example of suitable solvents are non-volatile solvents, which are preferably for example polyhalogenated paraffin such as chloroparaffin or polyhalogenated diphenyl, such as trichlorodiphenyl and also tricresylphosphate, di-n-butyl phthalate, dioctyl phthalate, trichlorobenzene, trichloroethyl phosphate, hydrocarbon oils such as paraffin, alkylated derivatives of diphenyl, naphthalene or triphenyl, terphenyl, partially hydrogenated terphenyl or other chlorinated or hydrogenated, fused, aromatic hydrocarbons.

The capsule walls can be formed uniformly around the droplets of the solution of the colour-forming agent by means of coacervation forces, and the encapsulating material can consist, for example, of gelatine and gum arabic, as described, for example, in U.S. Pat. No. 2,800,457. The capsules can preferably also be formed from an aminoplast or modified aminoplasts by polycondensation, as described in British Pat. Nos. 989,264, 1,156,725, 1,301,052 and 1,355,124.

The microcapsules containing the colour formers of the formula (1) can be used for the manufacture of pressure-sensitive copying materials of the most diverse known types. The various systems differ from one another essentially in the arrangement of the capsules and the colour reactants and in the carrier material.

A preferred arrangement is that in which the encapsulated colour former is in the form of a layer on the back of a transfer sheet and the electron acceptor is in the form of a layer on the front of a receiving sheet. However, the components can also be used in the paper pulp.

Another arrangement of the components is for the microcapsules containing the colour-formers and the developer to be in or on the same sheet, in the form of one or more individual layers, or in the paper pulp.

Such pressure sensitive copying materials are described for example in U.S. Pat. Nos. 2,730,457, 2,932,582, 3,418,250, 3,427,180 and 3,516,846. Further systems are described in British Pat. Nos. 1,042,596, 1,042,597, 1,042,598, 1,042,599 and 1,053,935.

Microcapsules which contain the colour formers of the formula (1) are suitable for each of the above arrangements and also for other pressure-sensitive systems.

The capsules are preferably attached to the carrier by means of a suitable adhesive. Since paper is the preferred carrier material, these adhesives are principally paper-coating agents, such as gum arabic, polyvinyl alcohol, hydroxymethylcellulose, casein, methylcellulose or dextrin.

As paper it is possible to use not only normal papers made from cellulose fibres, but also papers in which the cellulose fibres are replaced (partially or completely) by synthetic polymer fibres.

The phthalide compounds of the formulae (1) to (5) can also be used as colour formers in a thermo-reactive recording material. This contains as a rule at least one carrier, at least one colour former, at least one electron-acceptor and, optionally, also at least one binder. Thermo-reactive recording systems include e.g., heat-sensitive recording and copying materials and papers. These systems are employed for example, for the recording of information, e.g., in computers, teleprinters or telex machines, or in measuring instruments. The reproduction of the image (reproduction of the marking) can also be effected manually using a heated pen. A further means of reproducing markings by means of heat is the application of Laser beams.

The thermo-reactive recording material can be formed in such a way that the colour former is dissolved or dispersed in a layer of binder, and the developer is dissolved or dispersed in the binder in a second layer. A further possibility is for both the colour former and the developer to be dispersed in one layer. The binder is softened in specific areas by means of heat and at these points, to which heat is applied, the colour former comes into contact with the electron-acceptor and the desired colour develops immediately.

These developers are the same electron-acceptor substances as are used in pressure-sensitive papers. Examples of developers are the clay minerals and phenol resins already mentioned, or phenolic compounds, such as 4-tert-butylphenol, 4-phenylphenol, 4-hydroxyphenyl ether, α-naphthol, β-naphthol, 4-hydroxybenzoic acid methyl ester, 4-hydroxyacetophenone, 2,2'-dihydroxyphenyl, 4,4'-isopropylidenediphenol, 4,4'-isopropylidene-bis-(2-methylphenol), 4,4'-bis-(hydroxyphenyl)-valeric acid, hydroquinone, pyrogallol, phloroglucinol, p-, m- and o-hydroxybenzoic acid, gallic acid, 1-hydroxy-2-naphtoic acid and also boric acid and organic acids such as aliphatic dicarboxylic acids, such as tartaric acid, oxalic acid, maleic acid, citric acid, citraconic acid or succinic acid.

Preferably used for the production of the thermo-reactive recording material are film-forming binders which can be melted. These binders are usually water-soluble, whereas the phthalide compounds are the developer are insoluble in water. The binder should be capable of dispersing and fixing the colour former and the developer at room temperature. The binder softens or melts under the action of heat, so that the colour former comes into contact with the developer and can form a colour. Binders which are soluble in water or at last swellable in water are, e.g., hydrophilic polymers, such as polyvinyl alcohol, polyacrylic acid, hydroxyethylcellulose, methylcellulose, carboxymethylcellulose, polyacrylamide, polyvinylpyrrolidone, gelatin and starch.

If the colour former and the developer are in two separate layers, it is possible to use binders which are insoluble in water, that is to say binders, which are soluble in non-polar or only slightly polar solvents, such as natural rubber, synthetic rubber, chlorinated rubber, alkyd resins, polystyrene, styrene/butadiene copolymers, polymethyl methacryaltes, ethylcellulose, nitrocellulose and polyvinylcarbazole. The preferred arrangement is however, that whereby the colour former and the developer are contained in one layer in a water-soluble binder. The thermo-reactive layers can contain further additives. In order to imrove the degree of whitness, to facilitate printing of the papers and to prevent sticking of the heated pen, these layers can contain, e.g., talc, $TiO_2$, ZnO or $CaCO_3$, or organic pigments such as urea-formaldehyde polymers. In order to ensure that the colour is formed only within a limited temperature range, it is possible to add substances such as urea, thiourea, acetanilide, acetamide, phthalic anhydride or other corresponding fusible products which induce the simultaneous melting of the colour former and the developer.

Except where otherwise stated, the percentages and parts given in the following Examples relate to weight.

EXAMPLE 1

A mixture of 2.0 g, 3,3-bis-(1'-ethyl-2'-methyl-indol-3'-yl)-4,7-dichlorophthalide, 1.0 ml pyrrolidine and 10 ml dimethylsulphoxide is heated at 110° C. for 6 hours. The reaction mass is cooled to 20° C. and a mixture of 15 ml methanol and 25 ml water is added to precipitate the product which is then filtered off. The resulting 3,3-bis-(1'-ethyl-2'-methyl-indol-3'-yl)-4-chloro-7-N-pyrrolidinyl-phthalide of the formula

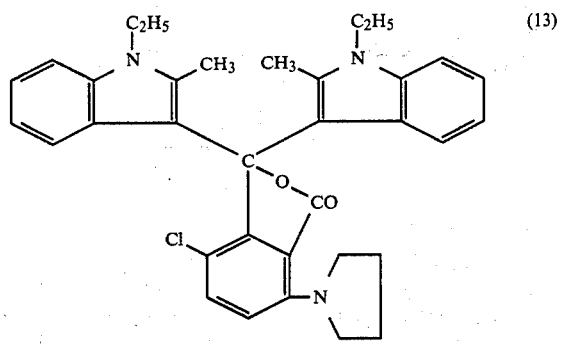

is crystallized from methanol to give 2.01 g of the cited phthalide compound as a white solid (m.p. 278°–279° C.) corresponding to 95.8% of the theory. In 95% acetic acid the phthalide compound has an absorption maximum (λ max) at 542 nm. This colour former develops on acid modified bentonite a red colour.

EXAMPLE 2

A mixture of 2.0 g 3,3-bis-(1'-ethyl-2'-methyl-indol-3'-yl)-4,5,6,7-tetrafluorophthalide, 1.0 ml pyrrolidine and 10 ml dimethylsulphoxide is treated at 100° C. for 1 hour. The reaction mass is cooled to 60° C. and a mixture of 5 ml methanol and 5 ml water is added to precipitate the product. The resulting 3,3-bis-(1'-ethyl-2'-methyl-indol-3'-yl)-4,6-difluoro-5,7-di-N-pyrrolidinyl-phthalide of the formula

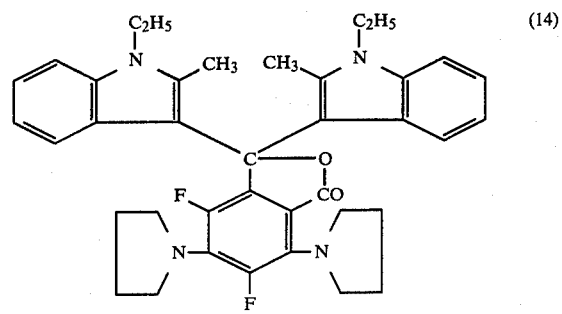

is filtered off, washed with aqueous methanol and dried to give 2.1 g of the cited phthalide compound corresponding to 91.3% of the theory. A specimen recrystallised from ethanol melts at 214° C. In 95% acetic acid the phthalide compound has a λ max of 540 nm. This colour former develops immediately on acid modified bentonite a red colour.

EXAMPLE 3

A mixture of 10.0 g 3,3-bis(1'-ethyl-2'-methyl-indol-3'-yl-) 4,5,6,7-tetrachlorophthalide, 5.0 ml piperidine and 50 ml toluene is heated at reflux temperature for 4 hours. The toluene is removed under reduced pressure and the residual solid is first treated with methanol and then with water to yield, after drying, 9.5 g of 3,3-bis-(1'-ethyl-2'-methyl-indol-3'-yl-)4,5,6-trichloro-7-piperidino-phthalide of the formula

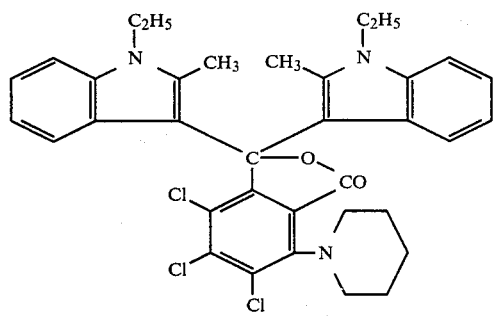
(15)

as a white solid which recrystallised from methanol melts at 255° C. In 95% acetic acid the phthalide compound has a λ max at 553 nm. This colour former develops immediately a red colour when contacted with acid modified bentonite.

EXAMPLE 4

A mixture of 10 g 3,3-bis-(1'-ethyl-2'-methyl-indol-3'-yl)4,5,6,7-tetrachlorophthalide, 5.0 ml piperidine and 50 ml dimethyl sulphoxide is heated at 100° C. for 4 hours. After cooling to 60° C. a mixture of 125 ml water and 75 ml methanol is added and the resultant precipitate is filtered off, washed with methanol and dried. 8.9 g of a mixture consisting of 3,3-bis-(1'-ethyl-2'-methyl-indol-3'-yl-)4,6-dichloro-5,7- di-piperidino-phthalide, 3,3-bis-(1'-ethyl-2'-methyl-indol-3'-yl)4,5,6-trichloro-7-piperidino-phthalide and 3,3-bis-(1'-ethyl-2'-methyl-indol-3'-yl)4,6,7-trichloro-5-piperidino-phthalide are obtained. In 95% acetic acid this mixture has a λ max at 550 nm. When contacted with acid modified bentonite, this phthalide mixure develops immediately a red colour.

The individual compounds are isolated by preparative layer chromatography on silica and listed in the following table as Example 3, 13 and 14.

The compounds listed in the following Table and which correspond to the formula

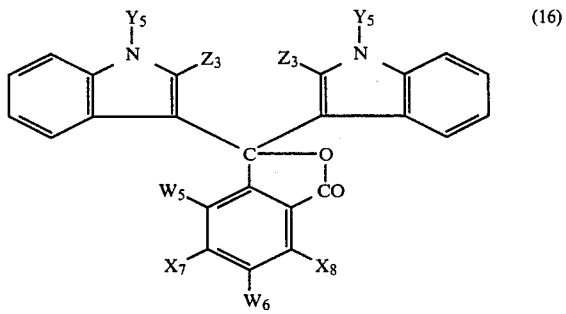
(16)

and manufactured according to Examples 1-4 or in analogous manner.

| Ex | $Y_5$ | $Z_3$ | $W_5$ | $X_7$ | $W_6$ | $X_8$ | M.P. °C. | λmax in 95% acetic acid |
|---|---|---|---|---|---|---|---|---|
| 1 | —$C_2H_5$ | $CH_3$ | Cl | H | H | —N⟨⟩ (5-ring) | 278–279 | 542 |
| 2 | —$C_2H_5$ | $CH_3$ | F | —N⟨⟩ | F | —N⟨⟩ | 214 | 540 |
| 3 | —$C_2H_5$ | $CH_3$ | Cl | Cl | Cl | —N⟨⟩ (6-ring) | 255 | 553 |
| 5 | —$C_2H_5$ | $CH_3$ | H | —N⟨⟩ | Cl | H | 232 | 537 |
| 6 | —$C_2H_5$ | $CH_3$ | H | —N⟨⟩ | H | Cl | 165 | 542 |
| 7 | —$C_2H_5$ | $CH_3$ | Cl | —N⟨⟩ | Cl | —N⟨⟩ | 235 | 543 |
| 8 | —$C_2H_5$ | $CH_3$ | Cl | —N⟨⟩ | Cl | Cl | 208 | 556 |
| 9 | —$C_2H_5$ | $CH_3$ | H | Cl | H | —N⟨⟩ | 176–177 | 537 |

-continued

| Ex | $Y_5$ | $Z_3$ | $W_5$ | $X_7$ | $W_6$ | $X_8$ | M.P. °C. | λmax in 95% acetic acid |
|---|---|---|---|---|---|---|---|---|
| 10 | $-C_2H_5$ | $CH_3$ | Cl | Cl | Cl | -N(pyrrolidine) | 146 | 552 |
| 11 | $-C_4H_9$ | H | Cl | Cl | Cl | -N(pyrrolidine) | 136–137 | 528 |
| 12 | $-C_4H_9$ | phenyl | Cl | Cl | Cl | -N(pyrrolidine) | 255–256 | 555 |
| 13 | $-C_2H_5$ | $CH_3$ | Cl | -N(piperidine) | Cl | -N(piperidine) | 230 | 545 |
| 14 | $-C_2H_5$ | $CH_3$ | Cl | -N(piperidine) | Cl | Cl | 240 | 556 |
| 15 | $-C_2H_5$ | $CH_3$ | Br | -N(piperidine) | Br | -N(piperidine) | 200 | 548 |
| 16 | $-C_2H_5$ | $CH_3$ | Br | Br | Br | -N(piperidine) | 257 | 553 |
| 17 | $-C_2H_5$ | $CH_3$ | Br | -N(piperidine) | Br | Br | 244 | 556 |
| 18 | $-C_8H_{17}$ | $CH_3$ | Cl | Cl | Cl | -N(piperidine) | 84–85 | 556 |
| 19 | $-C_2H_5$ | $CH_3$ | Cl | $-N(C_2H_5)_2$ | Cl | $-N(C_2H_5)_2$ | 188–190 | 545 |
| 20 | $-C_2H_5$ | $CH_3$ | Cl | Cl | Cl | $-N(C_2H_5)_2$ | 238–240 | 552 |
| 21 | $-C_2H_5$ | $CH_3$ | Cl | $-N(C_2H_5)_2$ | Cl | Cl | 257–259 | 556 |
| 22 | $-C_2H_5$ | $CH_3$ | Cl | $-NHC_2H_5$ | Cl | Cl | 257 | 556 |
| 23 | $-C_2H_5$ | $CH_3$ | Cl | $-NHC_2H_5$ | Cl | $-NHC_2H_5$ | 188 | 545 |
| 24 | $-C_2H_5$ | $CH_3$ | Cl | Cl | Cl | $-NHC_2H_5$ | 235 | 552 |
| 25 | $-C_2H_5$ | $CH_3$ | Cl | Cl | Cl | $-NHC_4H_9$ | 218–219 | 550 |
| 26 | $-C_2H_5$ | $CH_3$ | Br | $-NH-C_6H_5$ | Br | Br | 246–247 | 556 |
| 27 | $-C_2H_5$ | $CH_3$ | Br | Br | Br | $-NH-C_6H_5$ | 247 | 553 |
| 28 | $-C_2H_5$ | $CH_3$ | Cl | $-NH-C_6H_5$ | Cl | Cl | 203–205 | 555 |
| 29 | $-C_2H_5$ | $CH_3$ | Cl | Cl | Cl | $-NH-C_6H_5$ | 250 | 553 |
| 30 | $-C_2H_5$ | $CH_3$ | Cl | Cl | Cl | $-N(COCH_3)(C_4H_9)$ | 124–128 | 558 |

EXAMPLE 31

A mixture of 2.0 g 3,3-bis(4'-dimethyl-amino-phenyl-)4,5,6,7-tetrachlorophthalide, 1.5 ml pyrrolidine and 10 ml dimethyl sulphoxide is heated at 100° C. for 5 hours. The reaction mass is cooled to 25° C. and a mixture of 25 ml water and 15 ml methanol is added to precipitate a solid which is filtered off and dried to yield 1.9 g of the mixed phthalides 3,3-bis-(4'-dimethylaminophenyl)-4,5,6-trichloro-7-N-pyrrolidino-phthalide and 3,3-bis-(4'-dimethylaminophenyl)-4,6,7-trichloro-5-N-pyrrolidino-phthalide.

In 95% acetic acid the phthalide mixture has a λ max of 636 nm, showing an extinction coefficient ten times greater than that of the starting compound. When contacted with acid modified bentonite this phthalide mixture develops immediately a green colour.

EXAMPLE 32

If, in Example 31, the 3,3-bis-(4'-dimethylaminophenyl)-4,5,6,7-tetrachlorophthalide is replaced by 2.0 g of 3,3-bis-(4'-dimethylamino-phenyl)-5,6-dichlorophthalide and in other respects the procedure followed is as described in Example 31, 1.9. g (88,7% of theory) of a compound of the formula

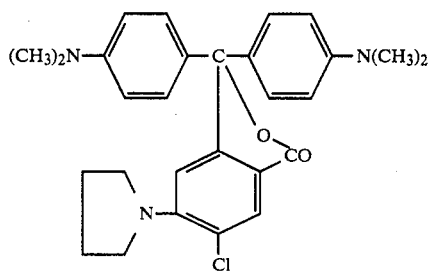

(17)

are obtained. When recrystallized from acetone, this compound melts at 130° C. In 95% acetic acid it has a λ max of 626 nm. When contacted with acid modified bentonite this phthalide compound develops immediately a green colour.

EXAMPLE 33

A mixture of 2.0 g of 3-(1'-ethyl-2'-methyl-indol-3'-yl-)3-(4''-diethylaminophenyl)-4,5,6,7-tetrachlorophthalide, 1.0 ml piperidine and 10 ml dimethylsulphoxide is heated at 100° C. for 4 hours. The reaction mass is cooled to 25° C. and 25 ml water and 15 ml methanol is added to precipitate a white solid which is filtered off and dried to yield 2.0 g of a mixture consisting of 3-(1'-ethyl-2'-methyl-indol-3-yl)-3-(4''-diethylamino-2''-ethoxyphenyl)-5-piperidino-4,6,7-trichlorophthalide and 3-(1'-ethyl-2'-methyl-indol-3'-yl)-3-(4'''-diethylamino phenyl)-7-piperidino-4,5,6-trichlorophthalide. Chromatographic separation on silica gives the 5-piperidino-phthalide as a white solid having a melting point of 287°–288° C. and λmax at 586 nm (in 95% acetic acid) and the 7-piperidino-phthalide as a white solid m.p. 191°–192° C. and λmax at 591 nm (in 95% acetic acid).

A strong blue colour develops immediately upon contacting acid modified bentonite with a solution in toluene of either the mixture, or the individual phthalides.

EXAMPLE 34

If, in Example 3, the 3,3-bis-(1'-ethyl-2'-methyl-indol-3'-yl-)4,5,6,7-tetrachlorophthalide and the piperidine are replaced by equivalent amounts of 3,3-bis-(1'-butyl-5'-methoxy-indol-3'-yl-4,5,6,7-tetrachlorophthalide and pyrrolidine and in other other respects the procedure followed is as described in Example 3 the 3,3-bis(-1'-n-butyl-5'-methoxy-indol-3'-yl-)7-pyrrolidinyl-4,5,6-trichlorophthalide of the formula

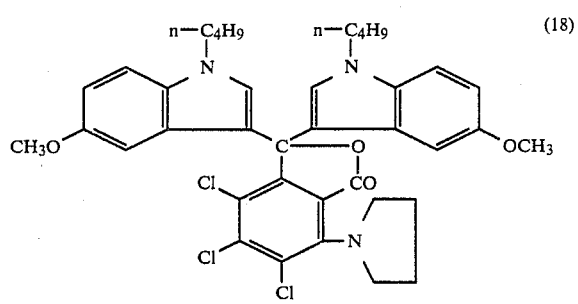

(18)

having a melting point of 123° C. is obtained. In 95% acetic acid this phthalide compound has an adsorption maximum (λmax) at 533 nm. This colour former develops on acid modified bentonite a red colour.

EXAMPLE 35

Production of a pressure-sensitive copying paper

A solution of 3 g of the phthalide compound of formula (15) in 97 g of partially hydrogenated terphenyl is emulsified in a solution of 12 g of pigskin gelatin in 88 g of water at 50° C. A solution of 12 g of gum arabic in 88 g of water at 50° C. is then added and an addition is subsequently made of 200 ml of water at 50° C. The resulting emulsion is poured into 600 g of ice water and cooled, with coacervation being thus effected. A sheet of paper is coated with the resulting suspension of micro-capsules and dried. A second sheet of paper is coated with silton clay. The first sheet and the sheet of paper coated with clay are placed together with the coatings adjacent to one another.

By means of writing by hand or with a typewriter on the first sheet, pressure is applied and on the sheet coated with clay there develops a red copy which has excellent fastness to light.

Corresponding red shade effects can be obtained using any of the other colour formers given in Examples 1, 2, 3, and 4 to 30 and 34.

EXAMPLE 36

A solution of 0.72 g of 3,3-bis-(1'-ethyl-2'-methylindol-3'-yl)-4,5,6-trichloro-7-N-pyrrolidinylphthalide, according to Example 10, 4.0 g of 2-n-octylamino-6-diethylaminofluoran, 0.3 g Crystal Violet lactone and 1.5 g benzoyl leuco methylene blue in 100 g hydrogenated terphenyl is emulsified in a solution of 12 g pigskin gelatin in 88 g water at 50° C. A solution of 12 g gum arabic in 88 g water at 50° C. is then added followed by 200 ml water at 50° C. The resulting emulsion is poured into 600 g ice water to effect coacervation. A sheet of paper is coated with the resulting suspension of microcapsules and dried. The sheet is placed with its coated side adjacent to a silton clay-coated sheet. By means of writing by hand or typewriter on the first sheet, pres-

We claim:

1. A phthalide compound of the formula

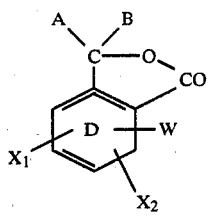
(1)

wherein A and B, independently of the other, represent a monovalent radical of the formula

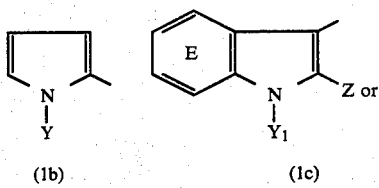

(1b)   (1c)

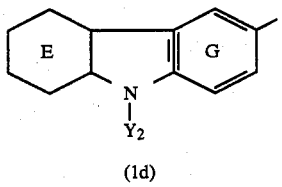

(1d)

wherein $X_1$ represents an amino group of the formula

$X_2$ represents halogen or an amino group of the formula

W is hydrogen or halogen, $T_1$ and $T_2$ together with the nitrogen atom to which they are attached represent a pyrrolidino or piperidino radical, Y, $Y_1$ and $Y_2$ each represent hydrogen, alkyl which has at most 12 carbon atoms and is unsubstituted or substituted by halogen, hydroxyl, lower alkoxy or cyano, or benzyl which is unsubstituted or substituted by halogen, nitro, lower alkyl or lower alkoxy, Z represents hydrogen, lower alkyl or phenyl, and wherein the benzene ring D is not further substituted or additionally contains halogen and the rings E and G independently of the other, are unsubstituted or substituted by halogen, nitro, lower alkyl or lower alkoxy, with the proviso that at least one of W and $X_2$ is halogen.

2. A phthalide compound according to claim 1 wherein $X_1$ is an amino group

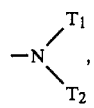

wherein $T_1$ and $T_2$ together with the nitrogen atom to which they are attached, represent a pyrrolidino or piperidino radical and $X_2$ is halogen.

3. A phthalide compound according to claim 1, wherein $X_1$ and $X_2$ are both an amino group

wherein $T_1$ and $T_2$, together with the nitrogen atom to which they are attached, represent a pyrrolidino or piperidino radical.

4. A phthalide compound according to claim 1, of the formula

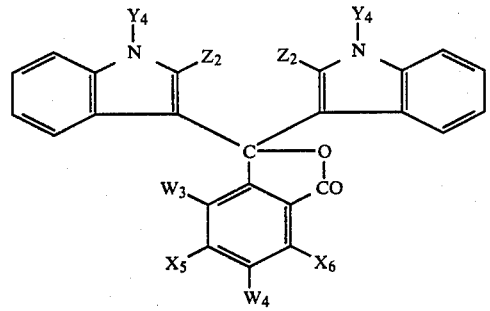
(4)

wherein $Y_4$ is alkyl of 1 to 8 carbon atoms or benzyl, $Z_2$ is methyl or phenyl, $W_3$ and $W_4$ are hydrogen, chlorine, fluorine or bromine, of $X_5$ and $X_6$ one is chlorine, bromine, fluorine, pyrrolidino or piperidino and the other is pyrrolidino or piperidino, with the proviso that at least one of $W_3$, $W_4$ and $X_5$ or $X_6$ is chlorine, fluorine or bromine.

5. A phthalide compound according to claim 4, wherein $Y_4$ is ethyl, $Z_2$ is methyl, $W_3$ and $W_4$ are fluorine and $X_5$ and $X_6$ are pyrrolidino.

6. A phthalide compound according to claim 4, wherein $Y_4$ is ethyl, $Z_2$ is methyl, $W_3$ and $W_4$ are chlorine and $X_5$ and $X_6$ are piperidino.

7. A phthalide compound according to claim 4, wherein $Y_4$ is ethyl, $Z_2$ is methyl, $W_3$, $W_4$ and $X_5$ are chlorine and $X_6$ is pyrrolidino.

8. A phthalide compound according to claim 1, of the formula (13)

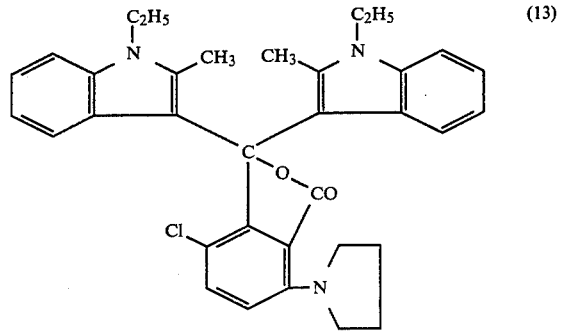
(13)

* * * * *